US009361794B1

(12) United States Patent
Lynch

(10) Patent No.: US 9,361,794 B1
(45) Date of Patent: Jun. 7, 2016

(54) METHOD AND APPARATUS FOR PROVIDING A MIXED MODE TRAFFIC MAP DISPLAY

(71) Applicant: HERE Global B.V., Veldhoven (NL)

(72) Inventor: James D. Lynch, Chicago, IL (US)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 14/560,897

(22) Filed: Dec. 4, 2014

(51) Int. Cl.
*G08G 1/00* (2006.01)
*G01C 21/34* (2006.01)

(52) U.S. Cl.
CPC . *G08G 1/00* (2013.01); *G01C 21/34* (2013.01)

(58) Field of Classification Search
USPC ........................................................ 701/118
See application file for complete search history.

(56) References Cited

U.S. PATENT DOCUMENTS

| | | | | |
|---|---|---|---|---|
| 6,680,694 B1 * | 1/2004 | Knockeart | ......... | G01C 21/3415 342/357.31 |
| 8,510,040 B2 * | 8/2013 | Nesbitt | ............... | G01C 21/3446 701/410 |
| 8,694,241 B1 * | 4/2014 | Kadous | ................ | G08G 1/0112 701/118 |
| 8,798,897 B2 * | 8/2014 | Fei | ....................... | G08G 1/0116 701/118 |
| 8,825,359 B1 * | 9/2014 | Wolf | ...................... | G01C 21/32 340/907 |
| 8,825,403 B1 * | 9/2014 | Kadous | .................. | G01C 21/32 701/527 |
| 8,972,187 B1 * | 3/2015 | Steinmetz | .............. | G01C 21/00 701/533 |
| 2010/0262901 A1 * | 10/2010 | DiSalvo | ................ | G06Q 40/04 715/227 |
| 2013/0297207 A1 * | 11/2013 | Mason | ............... | G01C 21/3407 701/533 |
| 2014/0278074 A1 * | 9/2014 | Annapureddy | .... | G01C 21/3453 701/468 |
| 2014/0303806 A1 * | 10/2014 | Bai | ..................... | G01C 21/3697 701/1 |
| 2015/0285656 A1 * | 10/2015 | Verheyen | ............... | G01C 21/32 701/428 |

* cited by examiner

*Primary Examiner* — Thomas Tarcza
*Assistant Examiner* — Alex C Dunn
(74) *Attorney, Agent, or Firm* — Ditthavong & Steiner, P.C.

(57) ABSTRACT

An approach is provided for presenting comprehensible representation of traffic flow information for various travel segments based on class levels. The approach involves causing, at least in part, a classification of one or more travel segments into one or more class levels. The approach also involves causing, at least in part, a designation of one or more representations of traffic flow information for the one or more travel segments based, at least in part, on the one or more class levels, wherein the one or more representations include, at least in part, a link-based traffic flow representation, a heatmap representation, or a combination thereof. The approach further involves causing, at least in part, a presentation of at least one user interface depicting the one or more representations of the traffic flow information for the one or more travel segments based, at least in part, on the designation.

19 Claims, 14 Drawing Sheets

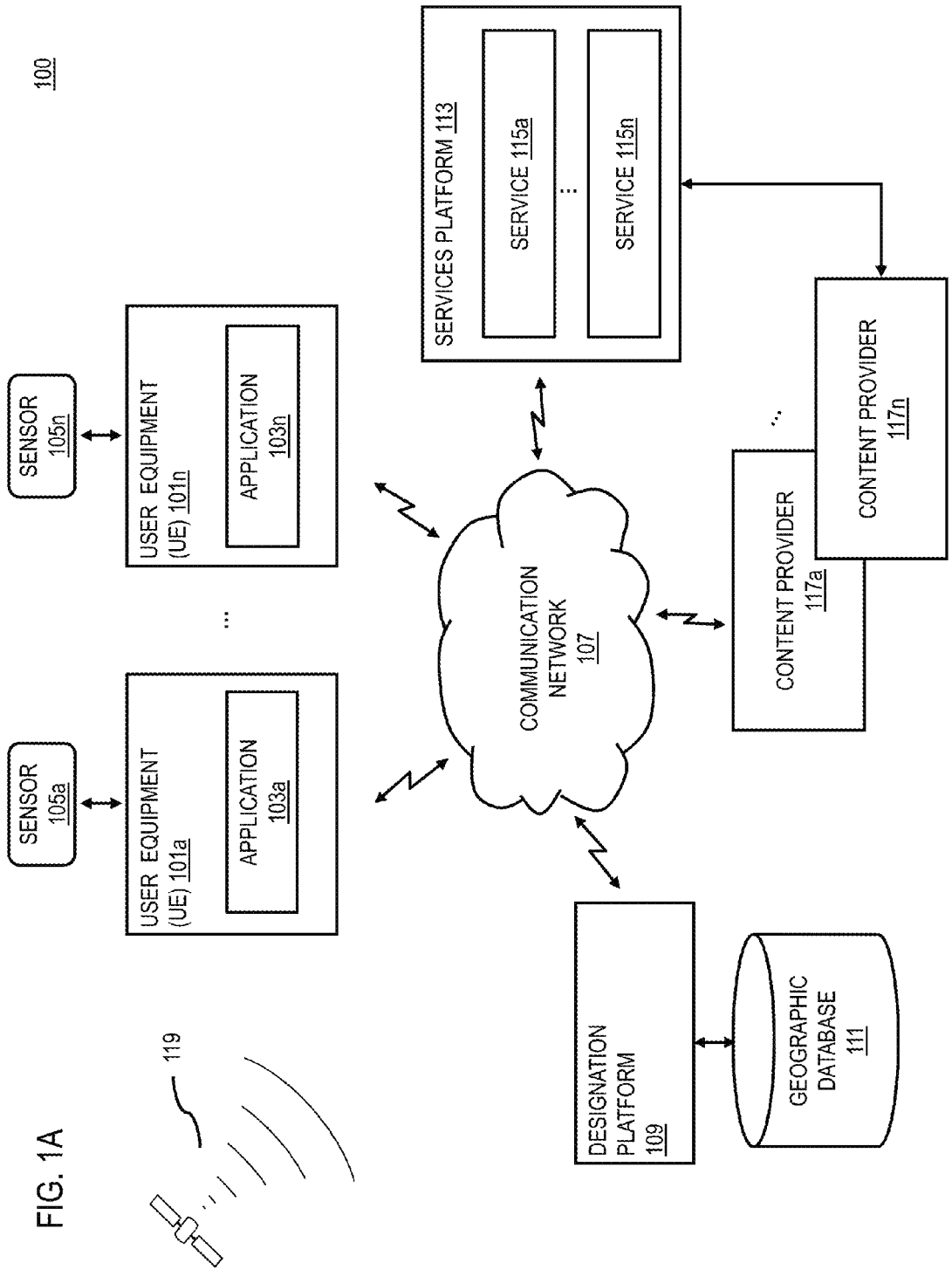

START → 301 CAUSE, AT LEAST IN PART, A CLASSIFICATION OF ONE OR MORE TRAVEL SEGMENTS INTO ONE OR MORE CLASS LEVELS → 303 CAUSE, AT LEAST IN PART, A DESIGNATION OF ONE OR MORE REPRESENTATIONS OF TRAFFIC FLOW INFORMATION FOR THE ONE OR MORE TRAVEL SEGMENTS BASED, AT LEAST IN PART, ON THE ONE OR MORE CLASS LEVELS → 305 CAUSE, AT LEAST IN PART, A PRESENTATION OF AT LEAST ONE USER INTERFACE DEPICTING THE ONE OR MORE REPRESENTATIONS OF THE TRAFFIC FLOW INFORMATION FOR THE ONE OR MORE TRAVEL SEGMENTS BASED, AT LEAST IN PART, ON THE DESIGNATION → END

METHOD AND APPARATUS FOR PROVIDING A MIXED MODE TRAFFIC MAP DISPLAY

BACKGROUND

Service providers and device manufacturers (e.g., wireless, cellular, etc.) are continually challenged to deliver value and convenience to consumers by, for example, providing compelling network services. One area of interest has been implementation of location sensing services and electronic mapping technologies to provide device users with on demand access to navigation services, for example, maps. However, the map display formats (e.g., roads shown as colored lines) combined with the speed of travel may increase the cognitive load of reading maps for a device user. Such map display is not always clear, and may present significant strains on the user's cognitive load. As a result, average users are confused and misguided.

SOME EXAMPLE EMBODIMENTS

Therefore, there is a need for an approach for presenting comprehensible representation of traffic flow information for various travel segments based on class levels.

According to one embodiment, a method comprises causing, at least in part, a classification of one or more travel segments into one or more class levels. The method also comprises causing, at least in part, a designation of one or more representations of traffic flow information for the one or more travel segments based, at least in part, on the one or more class levels, wherein the one or more representations include, at least in part, a link-based traffic flow representation, a heat-map representation, or a combination thereof. The method further comprises causing, at least in part, a presentation of at least one user interface depicting the one or more representations of the traffic flow information for the one or more travel segments based, at least in part, on the designation.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a classification of one or more travel segments into one or more class levels. The apparatus is also caused to cause, at least in part, a designation of one or more representations of traffic flow information for the one or more travel segments based, at least in part, on the one or more class levels, wherein the one or more representations include, at least in part, a link-based traffic flow representation, a heat-map representation, or a combination thereof. The apparatus is further caused to cause, at least in part, a presentation of at least one user interface depicting the one or more representations of the traffic flow information for the one or more travel segments based, at least in part, on the designation.

According to another embodiment, a computer-readable storage medium carries one or more sequences of one or more instructions which, when executed by one or more processors, cause, at least in part, an apparatus to cause, at least in part, a classification of one or more travel segments into one or more class levels. The apparatus is also caused to cause, at least in part, a designation of one or more representations of traffic flow information for the one or more travel segments based, at least in part, on the one or more class levels, wherein the one or more representations include, at least in part, a link-based traffic flow representation, a heat-map representation, or a combination thereof. The apparatus is further caused to cause, at least in part, a presentation of at least one user interface depicting the one or more representations of the traffic flow information for the one or more travel segments based, at least in part, on the designation.

According to another embodiment, an apparatus comprises means for causing, at least in part, a classification of one or more travel segments into one or more class levels. The apparatus also comprises means for causing, at least in part, a designation of one or more representations of traffic flow information for the one or more travel segments based, at least in part, on the one or more class levels, wherein the one or more representations include, at least in part, a link-based traffic flow representation, a heat-map representation, or a combination thereof. The apparatus further comprises means for causing, at least in part, a presentation of at least one user interface depicting the one or more representations of the traffic flow information for the one or more travel segments based, at least in part, on the designation.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of presenting comprehensible representation of traffic flow information for various travel segments based on class levels, according to one embodiment;

FIG. 3 is a flowchart of a process for classifying travel segments into one or more class levels to designate one or more representation of traffic flow information, according to one embodiment;

DESCRIPTION OF SOME EMBODIMENTS

Figure 1B:
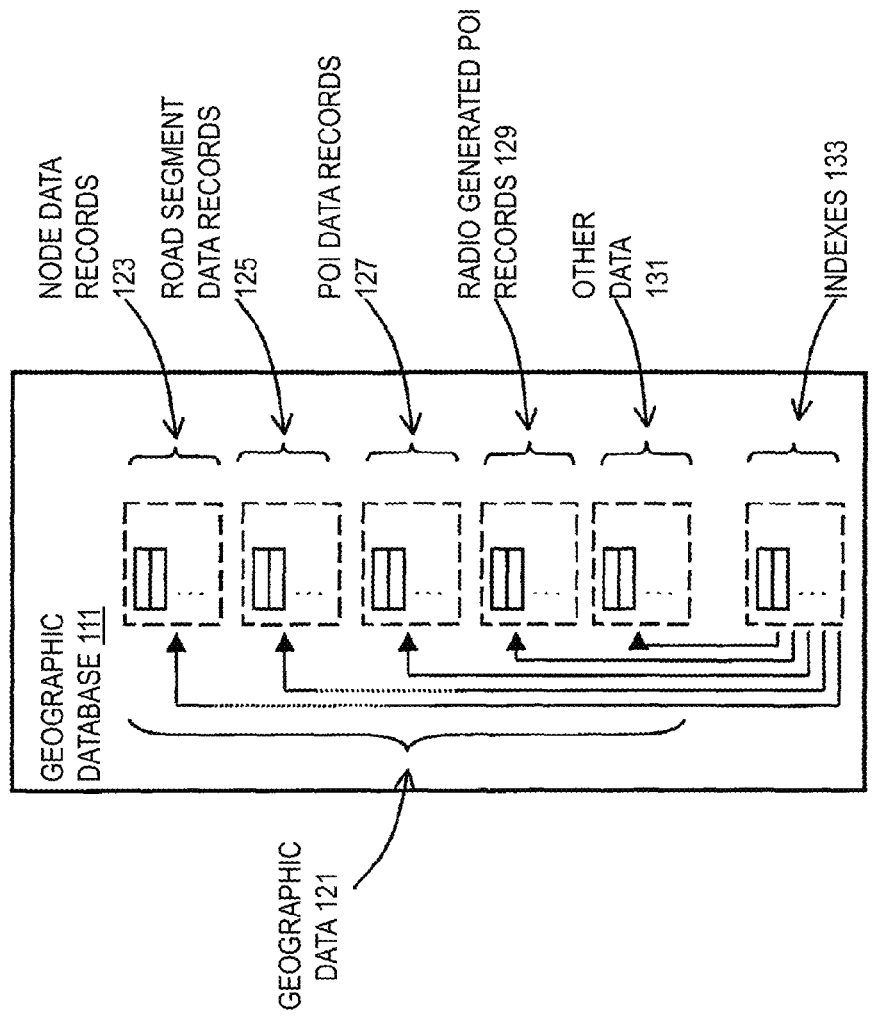
FIG. 1B is a diagram of the geographic database 111 of system 100, according to exemplary embodiments.

Examples of a method, apparatus, and computer program for presenting comprehensible representation of traffic flow information for various travel segments based on class levels are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system capable of presenting comprehensible representation of traffic flow information for various travel segments based on class levels, according to one embodiment. As discussed, navigation systems use location sensing (e.g., GPS) and electronic mapping technologies to provide navigation services, including the provision of traffic information via maps. Usually red, yellow or green colors are assigned to road segments to denote their traffic conditions. However, such color patterns for every single road segment may present a complex map display and may confuse users. For example, if a user is driving through a big grid of low function class roads that are interconnected, representation of every single individual road links with different colors may look like a massive interconnected blind that is ambiguous. In addition, there may be road segments with insufficient data, hence designating correct color to such road segments might be difficult.

To address this problem, a system 100 of FIG. 1 introduces the capability to present comprehensible representation of traffic flow information for various travel segments based on class levels. In one embodiment, the system 100 presents a mixture of heat-map representation and/or link-based traffic flow representation for one or more travel segments. In one scenario, the heat-map representation may signify lower function class roads. For example, if an intersection is congested for small roads, the blocks around the intersection is also congested. Hence, heat-map representation may well represent certain congested areas. In another scenario, heat-map representation may be initiated based, at least in part, on the supply density and quality of traffic information. If a region does not have enough data to make a specific statement about the traffic on any single road segment, but the general area has a lot of data, a heat-map representation can provide useful information about the region. In a further scenario, link-based traffic flow representation may signify high function class roads (e.g., highways). In another embodiment, the system 100 may determine conversion of heat-map to link level traffic, and/or link level traffic to heat-map based, at least in part, on traffic information, proximity information, or a combination thereof.

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a designation platform 109 via the communication network 107. In one embodiment, the designation platform 109 performs one or more functions associated with presenting comprehensible representation of traffic flow information for various travel segments based on class levels.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

By way of example, the applications 103 may be any type of application that is executable at the UE 101, such as mapping application (e.g., link-based traffic flow representation, heat-map representation), location-based service applications, navigation applications, content provisioning services, camera/imaging application, media player applications, social networking applications, calendar applications, and the like. In one embodiment, one of the applications 103 at the UE 101 may act as a client for the designation platform 109 and perform one or more functions associated with the functions of the designation platform 109 by interacting with the designation platform 109 over the communication network 107.

By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, and the like. In another embodiment, the sensors 105 may include light sensors, oriental sensors augmented with height sensor and acceleration sensor (e.g., an accelerometer can measure acceleration and can be used to determine orientation of the UE 101), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors 105 may detect weather data, traffic information, or a combination thereof. In one example embodiment, the UE 101 may include GPS receivers to obtain geographic coordinates from satellites 119 for determining current location and time associated with the UE 101. Further, the location can be determined by a triangulation system such as A-GPS, Cell of Origin, or other location extrapolation technologies. In another example embodiment, the one or more sensors may provide in-vehicle navigation services, wherein one or more location based services may be provided to the at least one UE 101 associated with the at least one user of the vehicle and/or at least one other UE 101 associated with the at least one vehicle.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the designation platform 109 may be a platform with multiple interconnected components. The designation platform 109 may include multiple servers, intelligent networking devices, computing devices, components and corresponding software for presenting comprehensible representation of traffic flow information for various travel segments based on class levels. In addition, it is noted that the designation platform 109 may be a separate entity of the system 100, a part of the one or more services 115a-115n (collectively referred to as services 115) of the services platform 113, or included within the UE 101 (e.g., as part of the applications 103.

In one embodiment, the designation platform 109 may cause a classification of one or more travel segments into one or more class levels. In one scenario, the designation platform 109 may determine a classification threshold for one or more travel lanes based, at least in part, on dimension information, traffic information, congestion level, or a combination thereof. The designation platform 109 may classify the travel segments into high function class level and low function class level. In another scenario, high function class level includes road segments with high traffic volume (e.g., highways), whereas low function class level includes road segments with low traffic volume (e.g., residential roads).

In one embodiment, the designation platform 109 may cause a designation of one or more representations of traffic flow information for the one or more travel segments based, at least in part, on the one or more class levels. In one scenario, the designation platform 109 may assign link-based traffic flow representation for travel segments classified as high function class level. In another scenario, the designation platform 109 may assign heat-map representation for travel segments classified as low function class level.

In one embodiment, the designation platform 109 may cause a presentation of at least one user interface depicting the one or more representations of the traffic flow information for the one or more travel segments based, at least in part, on the designation. In one scenario, the designation platform 109 may cause a presentation of the link-based traffic flow representation for the high function class level, and the heat-map representation for the low function class level. In one example embodiment, the designation platform 109 may cause a mixed mode traffic map display wherein the link-based traffic flow representation and the heat-map representation may denote one or more travel segments based on their class levels.

In one embodiment, the geographic database 111 may store attributes for one or more travel segments (i.e., traffic information (e.g., traffic volume, accidents etc.) in at least one travel segment, speed information, dimension information etc.). The information may be any multiple types of information that can provide means for aiding in the content provisioning and sharing process.

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the designation platform 109 and the content provider 117 to supplement or aid in the processing of the content information.

By way of example, the services 115 may be an online service that reflects interests and/or activities of users. The services 115 allow users to share location information, activities information, contextual information, historical user information and interests within their individual networks, and provides for data portability. The services 115 may additionally assist in providing the designation platform 109 with information on travel plans of at least one user, activity information for at least one user in at least one location, speed information for at least one user, user profile information, and a variety of additional information.

The content providers 117a-117n (collectively referred to as content provider 117) may provide content to the UE 101, the designation platform 109, and the services 115 of the services platform 113. The content provided may be any type of content, such as, image content (e.g., maps), textual content, audio content, video content, etc. In one embodiment, the content provider 117 may provide content that may supplement content of the applications 103, the sensors 105, or a combination thereof. By way of example, the content provider 117 may provide content that may aid in presenting comprehensible representation of traffic flow information. In one embodiment, the content provider 117 may also store content associated with the UE 101, the designation platform 109, and the services 115 of the services platform 113. In another embodiment, the content provider 117 may manage access to a central repository of data, and offer a consistent, standard interface to data, such as, a repository of attributes for one or more travel segments, traffic information, speed limit information in at least one travel segment, or a combination thereof. Any known or still developing methods, techniques or processes for presenting comprehensible representation of traffic flow information may be employed by the designation platform 109.

By way of example, the UE 101, the designation platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, radio generated POI records 129, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). In addition, the geographic database 111 can include data from radio advertisements associated with the POI data records 127 and their respective locations in the radio generated POI records 129. By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., designated parking areas). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions, for example mixed mode traffic map display for travelling in a route with minimal possibility of obstructions (e.g., traffic jams).

Figure 2:
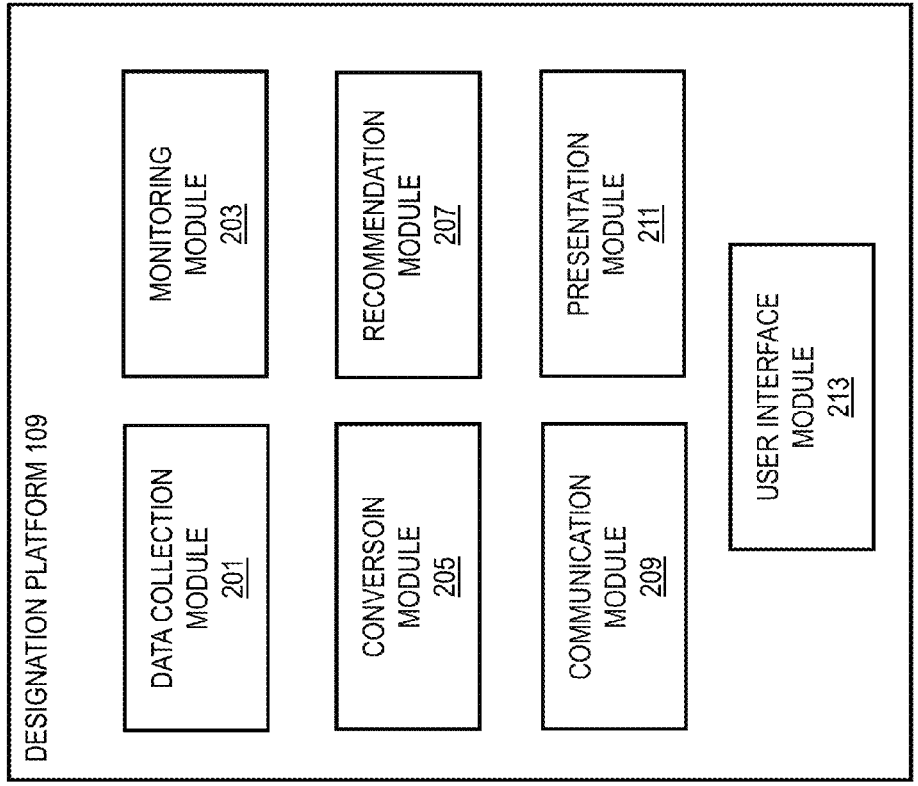
FIG. 2 is a diagram of the components of the designation platform 109, according to one embodiment.

FIG. 2 is a diagram of the components of the designation platform 109, according to one embodiment. By way of example, the designation platform 109 includes one or more components for presenting comprehensible representation of traffic flow information for various travel segments based on class levels. It is contemplated that the functions of these components may be combined in one or more components or performed by other components of equivalent functionality. In this embodiment, the designation platform 109 includes a data collection module 201, a monitoring module 203, a conversion module 205, a recommendation module 207, a communication module 209, a presentation module 211, and a user interface module 213.

In one embodiment, the data collection module 201 may accumulate road class level information, traffic information, or a combination thereof for one or more routing segments. In one scenario, the road class levels include a high function road class, a low function road class, or a combination thereof. The high function road class includes highways, arterial roads, collectors, other large roads, or a combination thereof, and the low function road class include local roads, residential roads, other smaller roads, or a combination thereof. In another scenario, road class levels for one or more routing segments is based, at least in part, on road dimensions, road types, road congestion, or a combination thereof. In a further scenario, road class levels for one or more routing segments is based on distance threshold, wherein distance threshold include spatial distance, actual graph distance, or a combination thereof.

In one embodiment, the monitoring module 203 may monitor location information for at least one user, at least one device associated with at least one user, or a combination thereof in real-time, periodically, according to schedule, on demand, or a combination thereof. The designation platform 109 may cause link-based traffic flow representation, heat-map representation, or a combination thereof based, at least in part, on the monitoring. In one example embodiment, the monitoring module 203 may determine that a user by mistake has pulled-off from the highway and has entered a residential area. Then, the designation platform 109 may cause a link-based traffic flow representation for a road segment the at least one user is in for navigational purposes.

In one embodiment, the conversion module 205 may convert a heat-map representation to a link-based traffic flow representation, and vice versa. In one scenario, the conversion may be based, at least in part, on proximity information, location information, or a combination thereof of at least one user, at least one device associated with at least one user, or a combination thereof.

In one embodiment, the recommendation module 207 may cause a recommendation of at least one alternative route based, at least in part, on traffic information. In one example embodiment, a user driving in a busy travel segment may be recommended to take an exit to a lower function road class that has less traffic. Then, the designation platform 109 may cause link-based traffic flow representation, heat-map representation, or a combination thereof based, at least in part, on the recommendation.

In one embodiment, the communication module 209 may cause, at least in part, a transmission of at least one communication from the designation platform 109 to the one or more UE 101s, or vice versa. Certain communications can be via methods such as an internet protocol, messaging (e.g., SMS, MMS, etc.), or any other communication method (e.g., via the communication network 107). The communication module 209 may be used to communicate commands, requests, data, etc. In one example embodiment, a UE 101 can send a request to the designation platform 109 via the communication module 209, and the designation platform 109 may then send a response back via the communication module 209. In another embodiment, the communication module 209 may be used for communication between the various modules (i.e. 201-213). The communication module 209 executes various protocols and data sharing techniques for connecting at least one UE 101 with the designation platform 109.

In one embodiment, the presentation module 211 obtains a set of summary statistics from other modules, and continues with providing a presentation of mixed mode traffic map representing one or more travel segments. The mixed mode of a traffic map includes a link-based traffic flow representation, a heat-map representation, or a combination thereof. In another embodiment, the presentation module 211 may cause a display of link-based traffic flow representation for high function road class, a heat-map representation for low function road class, or a combination thereof. In a further embodiment, the presentation module 211 may cause a presentation of a link-based traffic flow representation, a heat-map representation, or a combination thereof for one or more travel segments based, at least in part, on data density information, network information, or a combination thereof. In another embodiment, the presentation module 211 may cause a presentation of a link-based traffic flow representation, a heat-map representation, or a combination thereof based on time-based information, routing information, speed information, preference information, or a combination thereof.

In one embodiment, the user interface module 213 employs various application programming interfaces (APIs) or other function calls corresponding to the applications 103 of the UE 101, thus enabling the display of graphics primitives such as maps, menus, data entry fields, etc., for generating the user interface elements. By way of example, the user interface module 213 generates the interface in response to APIs or other function calls corresponding to the browser application of the UE 101, thus enabling the display of graphics primitives. In another embodiment, the user interface module 213 may cause a presentation of one or more travel segments in at least one user interface element of a user interface, wherein the representation of one or more travel segments include, at least in part, a mixed mode traffic map representation.

The above presented modules and components of the designation platform 109 can be implemented in hardware, firmware, software, or a combination thereof. Though depicted as a separate entity in FIG. 1, it is contemplated that the designation platform 109 may be implemented for direct operation by respective UE 101s. As such, the designation platform 109 may generate direct signal inputs by way of the operating system of the UE 101 for interacting with the applications 103. In another embodiment, one or more of the modules 201-213 may be implemented for operation by respective UE 101s, as a designation platform 109, or combination thereof. Still further, the designation platform 109 may be integrated for direct operation with the services 115, such as in the form of a widget or applet, in accordance with an information and/or subscriber sharing arrangement. The various executions presented herein contemplate any and all arrangements and models.

Figure 12:
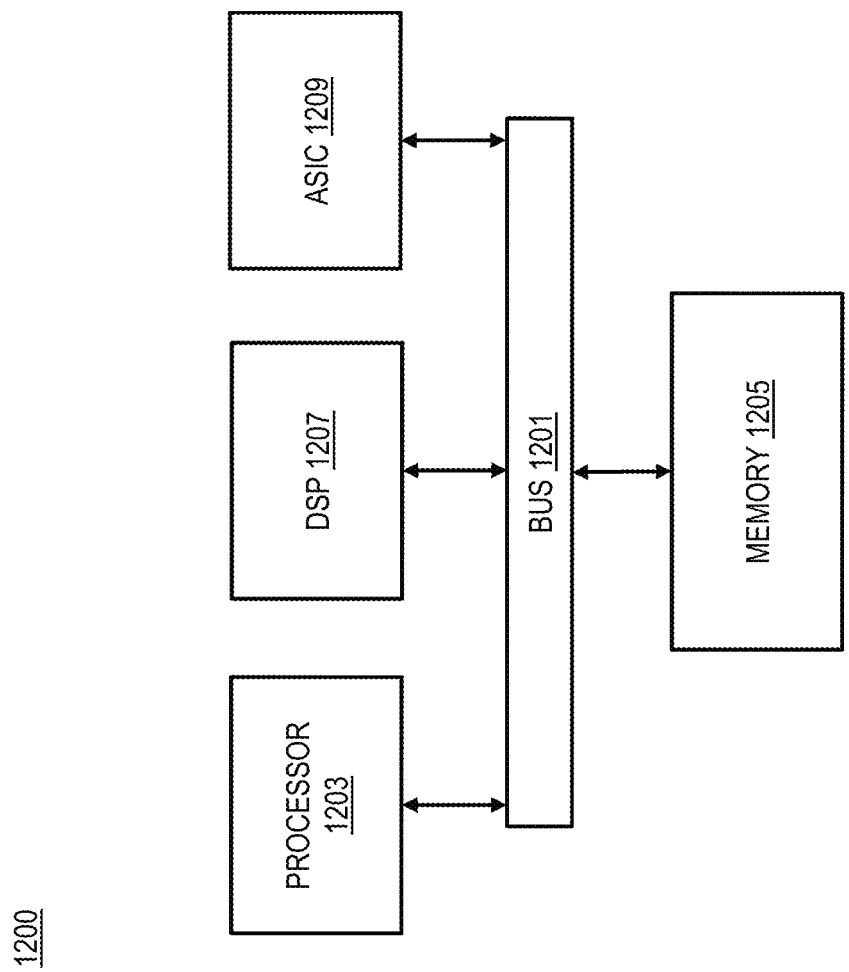
FIG. 12 is a diagram of a chip set that can be used to implement an embodiment of the invention.

FIG. 3 is a flowchart of a process for classifying travel segments into one or more class levels to designate one or more representation of traffic flow information, according to one embodiment. In one embodiment, the designation platform 109 performs the process 300 and is implemented in, for instance, a chip set including a processor and a memory as shown in FIG. 12.

In step 301, the designation platform 109 may cause, at least in part, a classification of one or more travel segments into one or more class levels. In one scenario, the one or more class levels include, at least in part, a high function class level, a low function class level, or a combination thereof.

In step 303, the designation platform 109 may cause, at least in part, a designation of one or more representations of traffic flow information for the one or more travel segments based, at least in part, on the one or more class levels. The one or more representations include, at least in part, a link-based traffic flow representation, a heat-map representation, or a combination thereof. In one scenario, the designation platform 109 may collect and display traffic flow spatially as a heat-map representation for low function class roads. In another scenario, the designation platform 109 may use link-based traffic flow representation for high function class roads.

In step 305, the designation platform 109 may cause, at least in part, a presentation of at least one user interface depicting the one or more representations of the traffic flow information for the one or more travel segments based, at least in part, on the designation. In one example embodiment, a user may be presented with a combination of link-based traffic flow representation and a heat-map representation for one or more travel segments. In one scenario, the proximity of a user and/or a device associated with a user to a travel segment may change the heat-map representation for the travel segment into a link-based traffic flow representation. Correspondingly, the designation platform 109 may generate heat-map representation for distant travel segments. In one scenario, proximity information may include a spatial distance (e.g., a straight line distance), a travel/network distance (e.g., when following roads and connectivity), or a combination thereof. For example, spatial distance for a road X that passes below (underpass) the current driven road may be small, but road X is not be connected to the currently driven road, therefore a user may have to travel a long distance along the road network. In such cases, the designation platform 109 may cause a representation of a 'far' distance display mode for road X.

Figure 4:
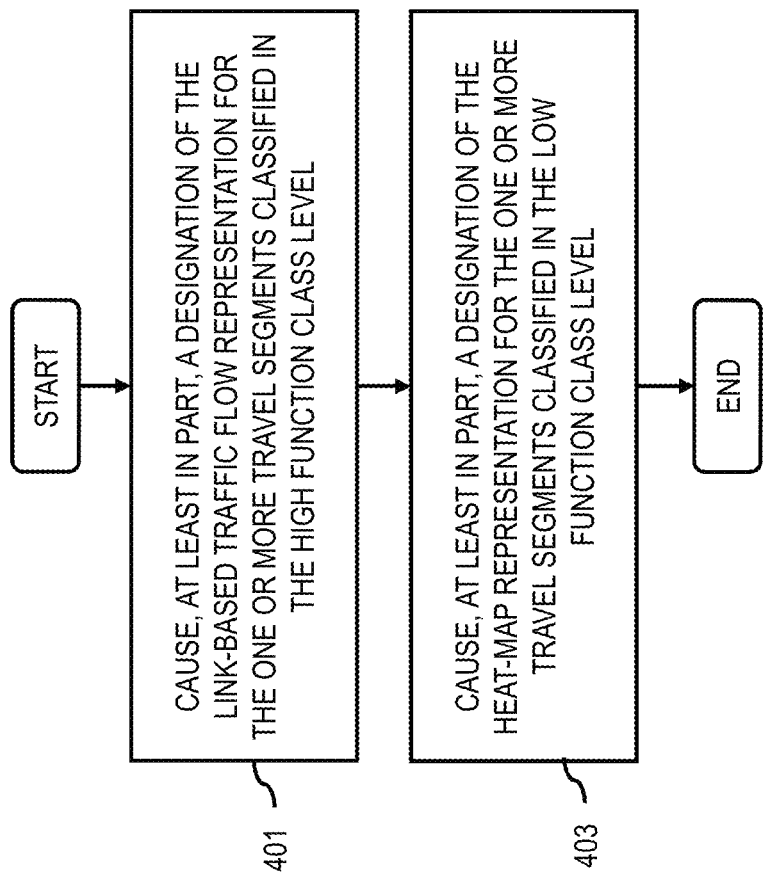
FIG. 4 is a flowchart of a process for causing link-based traffic flow representation and/or heat-map representation for one or more travel segments, according to one embodiment.

FIG. 4 is a flowchart of a process for causing link-based traffic flow representation and/or heat-map representation for one or more travel segments, according to one embodiment. In one embodiment, the designation platform 109 performs the process 400 and is implemented in, for instance, a chip set including a processor and a memory as shown in FIG. 12.

In step 401, the designation platform 109 may cause, at least in part, a designation of the link-based traffic flow representation for the one or more travel segments classified in the high function class level. In one scenario, the designation platform 109 may cause a depiction of high function class travel segments (e.g., highways, other large roads with high traffic volume etc.) with link-based traffic flow representation. In one scenario, link-based traffic flow representations include one or more colored lines to represent traffic flow in one or more travel segments. For example, red colored lined may represent high traffic congestion whilst green colored lines may represent minimal traffic flow.

In step 403, the designation platform 109 may cause, at least in part, a designation of heat-map representation for the one or more travel segments classified in the low function class level. In one scenario, the designation platform 109 may cause a depiction of low function class travel segments (e.g., local roads, other small roads, etc.) with heat-map representation. In one scenario, heat-map representation includes coloured depiction of traffic data for an area in two-dimensional maps. In one scenario, a typical heat map may be a two-dimensional map based on spatial proximity, network connectivity, or a combination thereof. For instance, a road that passes below the current driven road but is not connected with the current driven road may share spatial proximity but not network connectivity. In case of network connectivity, the travel data may be averaged along the network graph. The standard heat-map is analogous to showing a heat-map where heat is equally radiated in all directions. The one or more points in the heat-map may blend into each other equally based on the spatial distance. However, the network heat-map representation may be analogous to heat being restricted to moving along a connected network of pipes. The heat is eventually distributed, but the distance is not simply a two-dimensional spatial distance, but the distance the heat had to travel only the pipe. The heat-map representation may be time based, capturing traffic activity over a certain time interval in a given area. In another scenario, the designation platform 109 may determine when to convert an area or a portion of an area to a heat-map representation based, at least in part, on location information, data density information, network resources information, or a combination thereof. In one embodiment, the heat-map representation may be classified using density and/or quality of traffic information. If a region does not have enough data to make a specific statement about the traffic on any single road segment, but the general area has a lot of data, a heat-map representation can provide useful information about the region. In another embodiment, the link-based traffic flow representation and the heat-map representation may be displayed at the same time. However, the display types may be classified based, at least in part, on the freshness of the data (e.g., historical traffic data versus current traffic data). For example, at the same location, the heat-map representation may show current conditions (e.g., low confidence when low sample density), while the historical data (e.g., high density) may be shown as a link-based traffic information.

Figure 5:
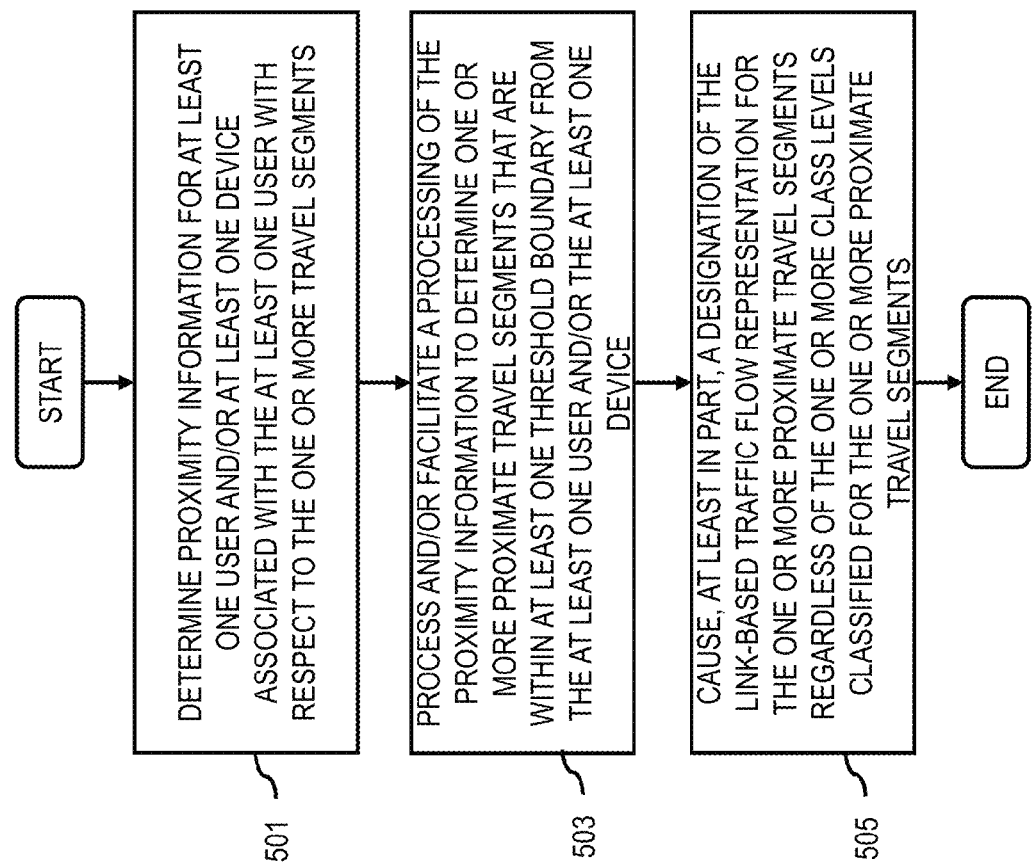
FIG. 5 is a flowchart of a process for designating heat-map representation for travel segments based on proximity information, according to one embodiment.

FIG. 5 is a flowchart of a process for designating heat-map representation for travel segments based on proximity information, according to one embodiment. In one embodiment, the designation platform 109 performs the process 500 and is implemented in, for instance, a chip set including a processor and a memory as shown in FIG. 12.

In step 501, the designation platform 109 may determine proximity information for at least one user, at least one device associated with the at least one user, or a combination thereof with respect to the one or more travel segments. In one scenario, the designation platform 109 may receive geographic coordinates for a user and/or UE 101 associated with a user in one or more travel segments via sensors 105 and/or satellites 119.

In step 503, the designation platform 109 may process and/or facilitate a processing of the proximity information to determine one or more proximate travel segments that are within at least one threshold boundary from the at least one user, the at least one device, or a combination thereof.

In step 505, the designation platform 109 may cause, at least in part, a designation of the link-based traffic flow representation for the one or more proximate travel segments regardless of the one or more class levels classified for the one or more proximate travel segments. In one scenario, the designation platform 109 may cause a link-based traffic flow representation for one or more proximate low function class travel segment (e.g., local roads).

Figure 6:
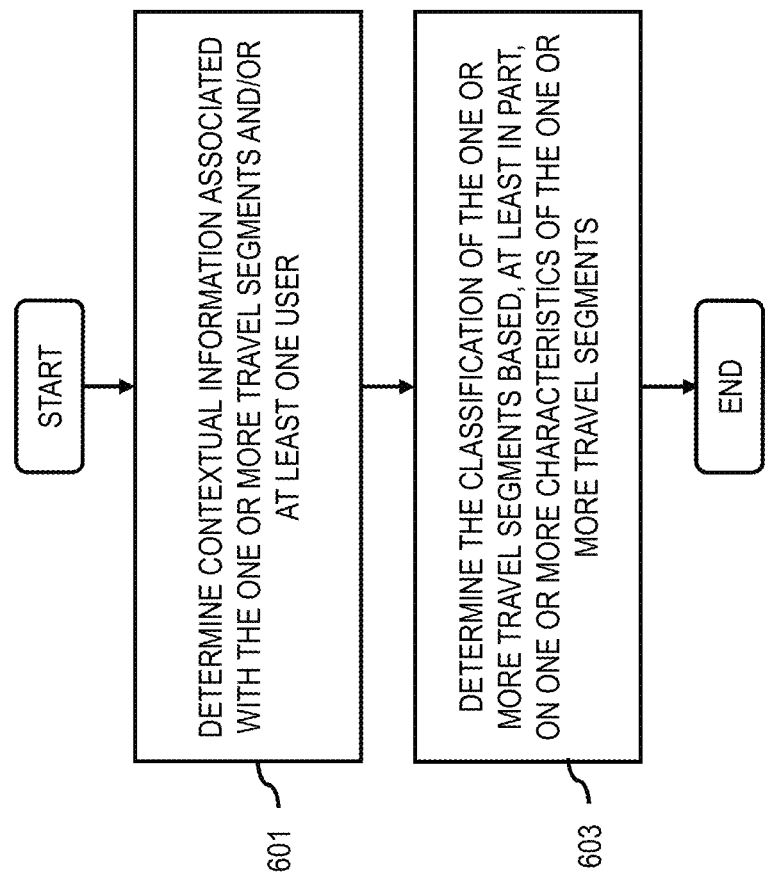
FIG. 6 is a flowchart of a process for designating one or more representations based on contextual information, and causing a classification of travel segments based on their characteristics, according to one embodiment.

FIG. 6 is a flowchart of a process for designating one or more representations based on contextual information, and causing a classification of travel segments based on their characteristics, according to one embodiment. In one embodiment, the designation platform 109 performs the process 600 and is implemented in, for instance, a chip set including a processor and a memory as shown in FIG. 12.

In step 601, the designation platform 109 may determine contextual information associated with the one or more travel segments, at least one user, or a combination thereof, wherein the designation of the one or more representations is further based, at least in part, on the contextual information. In one scenario, the contextual information includes, at least in part, temporal information, routing information, speed information, preference information, point-of-interest information, or a combination thereof. In one scenario, the designation platform 109 may intelligently generate a map that combines link-based traffic flow representation and heat-map representation based, at least in part, on the contextual information.

In step 603, the designation platform 109 may determine the classification of the one or more travel segments based, at least in part, on one or more characteristics of the one or more travel segments. In one scenario, the one or more characteristics include, at least in part, travel segment dimension information, travel segment type information, congestion information, or a combination thereof. In one scenario, travel segments with larger dimensions and high congestion level may be classified as high function class level, whereas travel segments with smaller dimensions and medium congestion level may be classified as low function class level.

Figure 7:
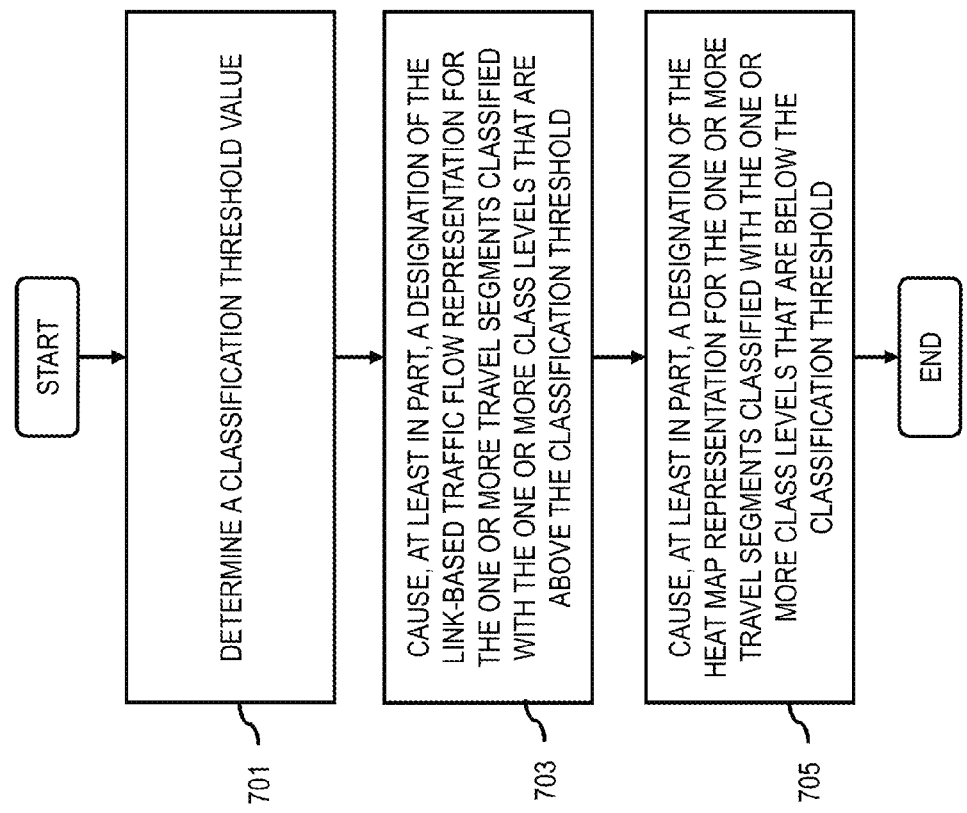
FIG. 7 is a flowchart of a process for designating one or more representations based on classification threshold, according to one embodiment.

FIG. 7 is a flowchart of a process for designating one or more representations based on classification threshold, according to one embodiment. In one embodiment, the designation platform 109 performs the process 700 and is implemented in, for instance, a chip set including a processor and a memory as shown in FIG. 12.

In step 701, the designation platform 109 may determine a classification threshold value. In one scenario, the designation platform 109 may cause a classification of one or more travel segments based, at least in part, on distance threshold, wherein distance threshold include spatial distance, actual graph distance, or a combination thereof. In another scenario, the designation platform 109 may cause a classification of one or more travel segments based, at least in part, on traffic information, dimension information, location information, or a combination thereof.

In step 703, the designation platform 109 may cause, at least in part, a designation of the link-based traffic flow representation for the one or more travel segments classified with the one or more class levels that are above the classification threshold.

In step 705, the designation platform 109 may cause, at least in part, a designation of the heat-map representation for the one or more travel segments classified with the one or more class levels that are below the classification threshold.

Figure 8:
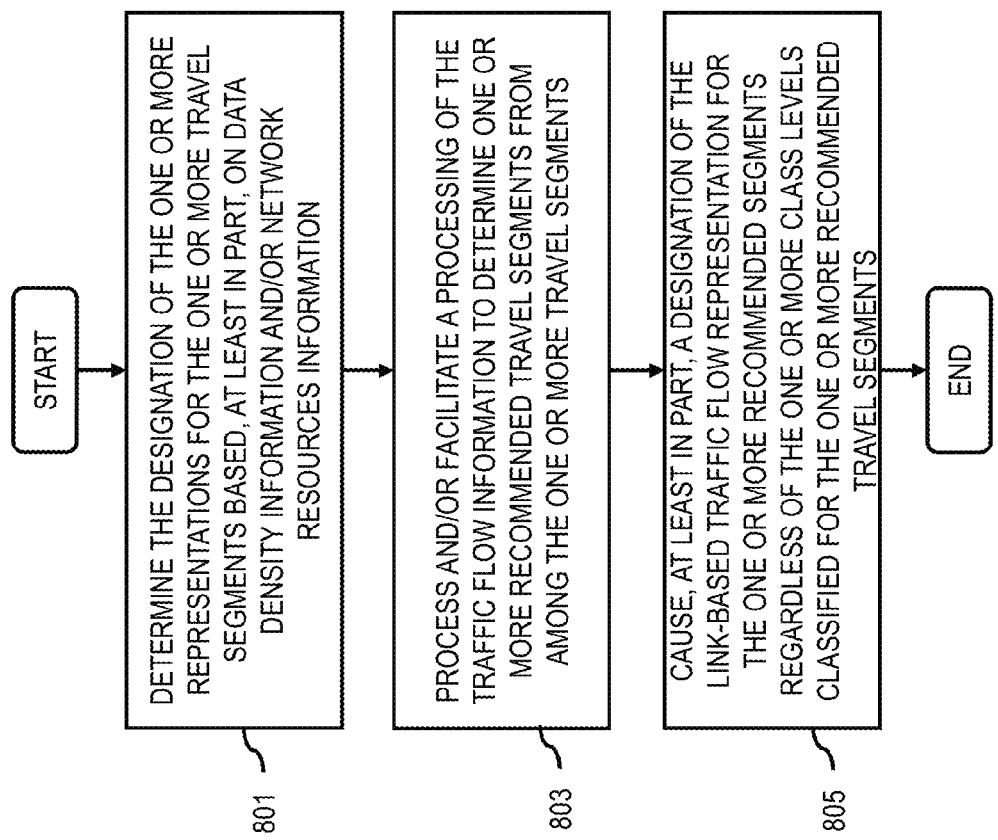
FIG. 8 is a flowchart of a process for designating one or more representations for travel segments based on data density information, network resource information, recommended travel segments, or a combination thereof, according to one embodiment.

FIG. 8 is a flowchart of a process for designating one or more representations for travel segments based on data density information, network resource information, recommended travel segments, or a combination thereof, according to one embodiment. In one embodiment, the designation platform 109 performs the process 800 and is implemented in, for instance, a chip set including a processor and a memory as shown in FIG. 12.

In step 801, the designation platform 109 may determine the designation of the one or more representations for the one or more travel segments based, at least in part, on data density information, network resources information, or a combination thereof. In one scenario, the designation platform 109 may cause a selection of at least one representation for one or more travel segments (e.g., heat-map representation) based on data density information because a user may have limited data plan. In another scenario, the designation platform 109 may cause a selection of at least one representation for one or more travel segments (e.g., heat-map representation) based on network resource information because channels in a traffic system have limited bandwidth. In a further scenario, the designation platform 109 may cause a selection of at least one representation for one or more travel segments based, at least in part, on quality of data, comparison of data to the historical data, or a combination thereof.

In step 803, the designation platform 109 may process and/or facilitate a processing of the traffic flow information to determine one or more recommended travel segments from among the one or more travel segments. In one scenario, the designation platform 109 may process traffic information for high function class travel segments, a low function class travel segments, or a combination thereof to determine a suitable travel segment for a user. Then, the designation platform 109 may recommend at least one travel segment to a user based, at least in part, on the determination. In one example embodiment, a user in a slow moving travel segment (e.g., highway) is likely to make an exit. The designation platform 109 may recommend the user travelling in the congested highway to take an exit to a lower level road (e.g., local road) with minimal traffic.

In step 805, the designation platform 109 may cause, at least in part, a designation of the link-based traffic flow representation for the one or more recommended segments regardless of the one or more class levels classified for the one or more recommended travel segments. In one example embodiment, the designation platform 109 may cause a link-based traffic flow representation for at least one recommended low function class travel segment (e.g., local roads).

Figure 9:
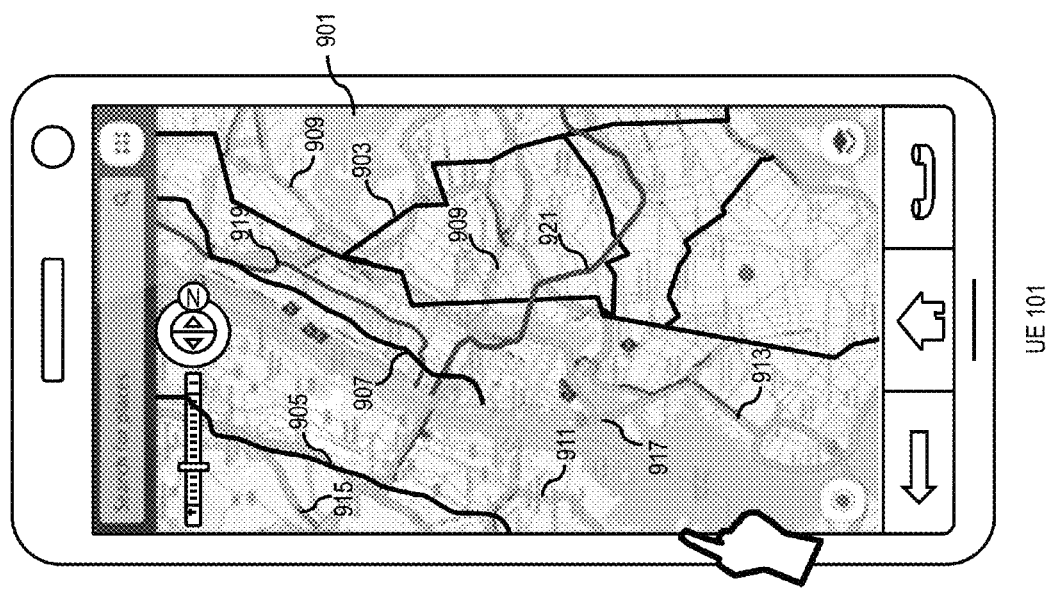
FIG. 9 is a user interface diagram for a map wherein various travel segments are represented by means of different color patterns, according to one example embodiment.

FIG. 9 is a user interface diagram for a map wherein various travel segments are represented by means of different color patterns, according to one example embodiment. In one scenario, travel segments in map 901 are color coded based, at least in part, on the traffic information (e.g., rate of flow of traffic on various routes). The colors (e.g., light grey, dark grey, black) may correspond to various levels of traffic congestion, with light grey signifying the lowest level of traffic congestion, and black signifying the highest level of traffic congestion. In one example embodiment, highest level of traffic congestion is represented by black color in travel segments 903, 905, and 907, whilst the lowest level of traffic congestion is represented by light grey color in travel segments 909, 911, 913, 915 and 917. Further medium level of traffic congestion is denoted by dark grey color in travel segments 919 and 921. Unfortunately, colored representation of every single individual travel segments looks like a big massive interconnected blinds that are confusing for users while driving. In addition, the idea of color coding every single travel segments may not be efficient when there is not enough data for a certain travel segment (e.g., low level roads). For instance, incomplete data makes it tough to put correct color on the travel segment. In such cases, link-based traffic flow does not work.

Figure 10:
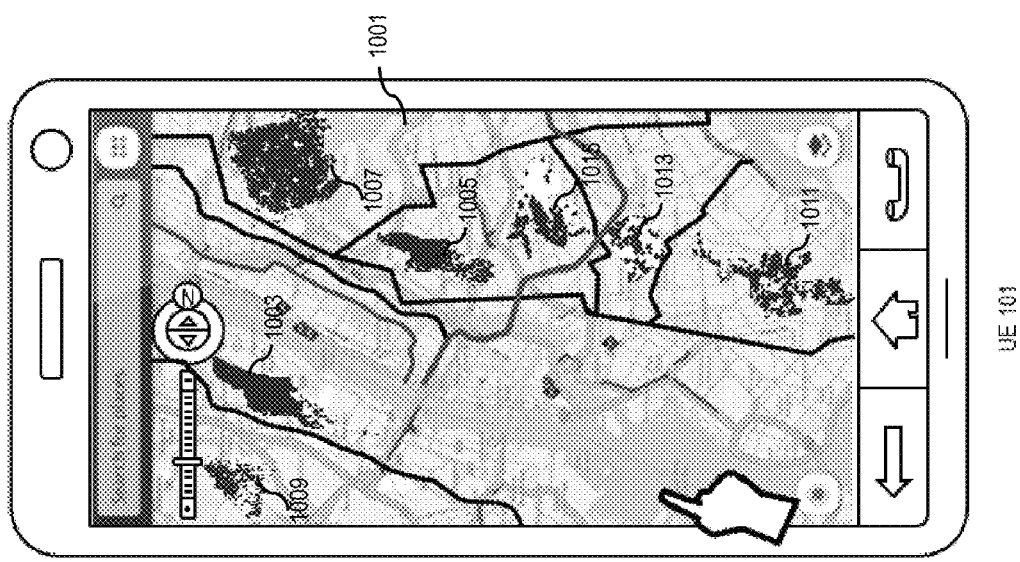
FIG. 10 is a user interface diagram of heat-map representation for one or more travel segments, according to one example embodiment

FIG. 10 is a user interface diagram of heat-map representation for one or more travel segments, according to one example embodiment. In one scenario, map 1001 generates a heat-map based on the traffic flow data. A heat-map is a technique for creating a graphical representation of data where the values taken by a variable in a two-dimensional map are represented as colors. There are different types of heat-maps used in different disciplines, each referred to by the term "heat-map," even though they use different visualization techniques. In one scenario, heat-maps represent location-based data, highlighting trends, anomalies and distributions across one or more routes. A heat-map, according to one embodiment, uses a topographic mapping approach and colorizes areas of activity (e.g., traffic flows in and out of a road segment). The heat-map identifies geographic trends and anomalies in the traffic flow data, maps the density of traffic flow at given points or over given intervals of time. In one example embodiment, heat-map 1003 and 1005 represents geographic areas with high traffic activity, whilst heat-map 1007, 1009, 1011 and 1013 represents geographic areas with minimal traffic activity. Further, heat-map 1015 represents a geographic area with medium level of traffic activity. In one scenario, the designation platform 109 may label one or more routes and/or one or more geographic areas with link-based traffic flows and/or heat-maps, respectively. Then, the designation platform 109 may cause a presentation of link-based traffic flows and/or heat-maps in a user interface (e.g., map 1001).

The processes described herein for presenting comprehensible representation of traffic flow information for various travel segments based on class levels may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
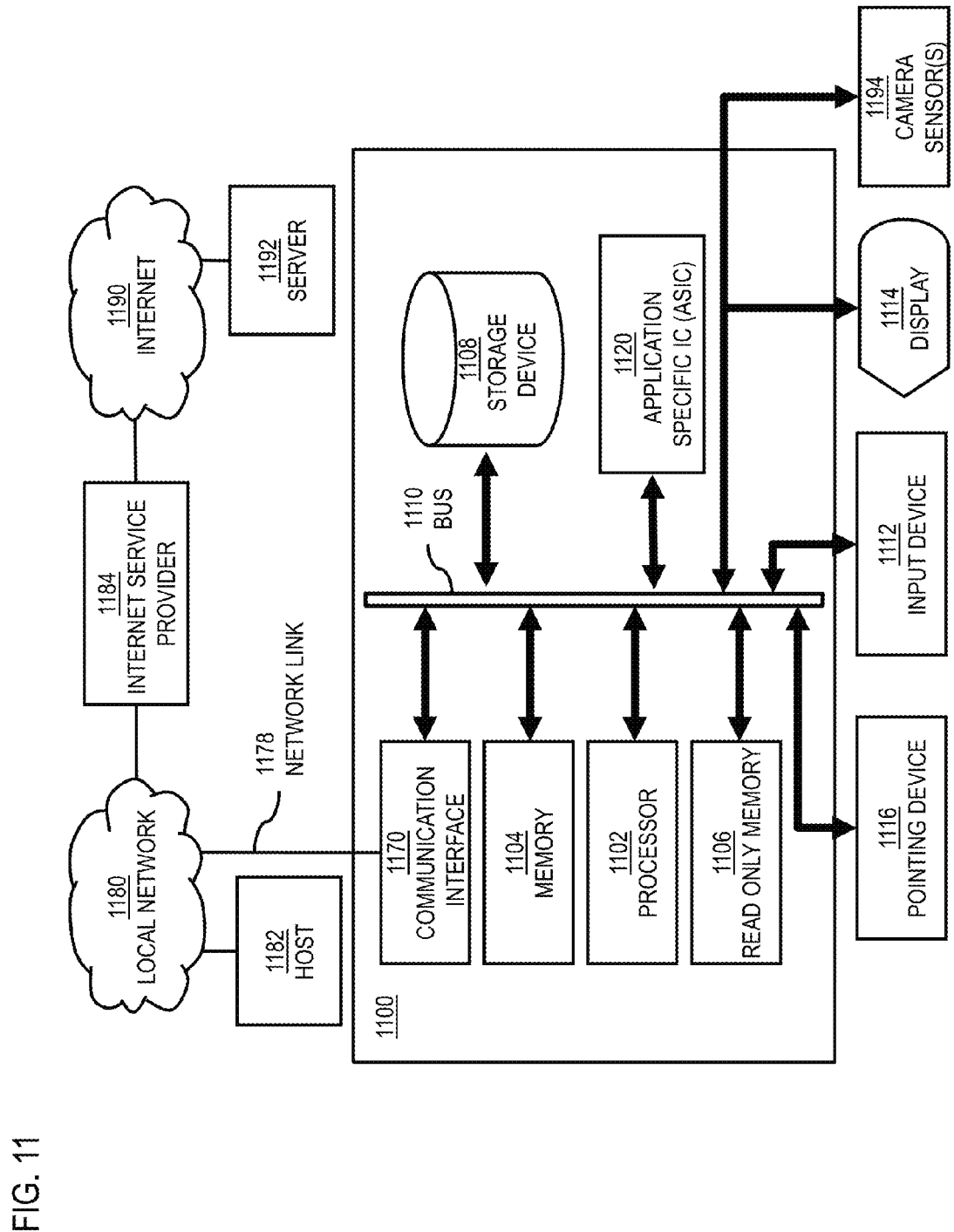
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to present comprehensible representation of traffic flow information for various travel segments based on class levels as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of presenting comprehensible representation of traffic flow information for various travel segments based on class levels.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to presenting comprehensible representation of traffic flow information for various travel segments based on class levels. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for presenting comprehensible representation of traffic flow information for various travel segments based on class levels. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for presenting comprehensible representation of traffic flow information for various travel segments based on class levels, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for presenting comprehensible representation of traffic flow information for various travel segments based on class levels to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to present comprehensible representation of traffic flow information for various travel segments based on class levels as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of presenting comprehensible representation of traffic flow information for various travel segments based on class levels.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to present comprehensible representation of traffic flow information for various travel segments based on class levels. The memory 1205 also stores the data associated with or generated by the execution of the inventive steps.

Figure 13:
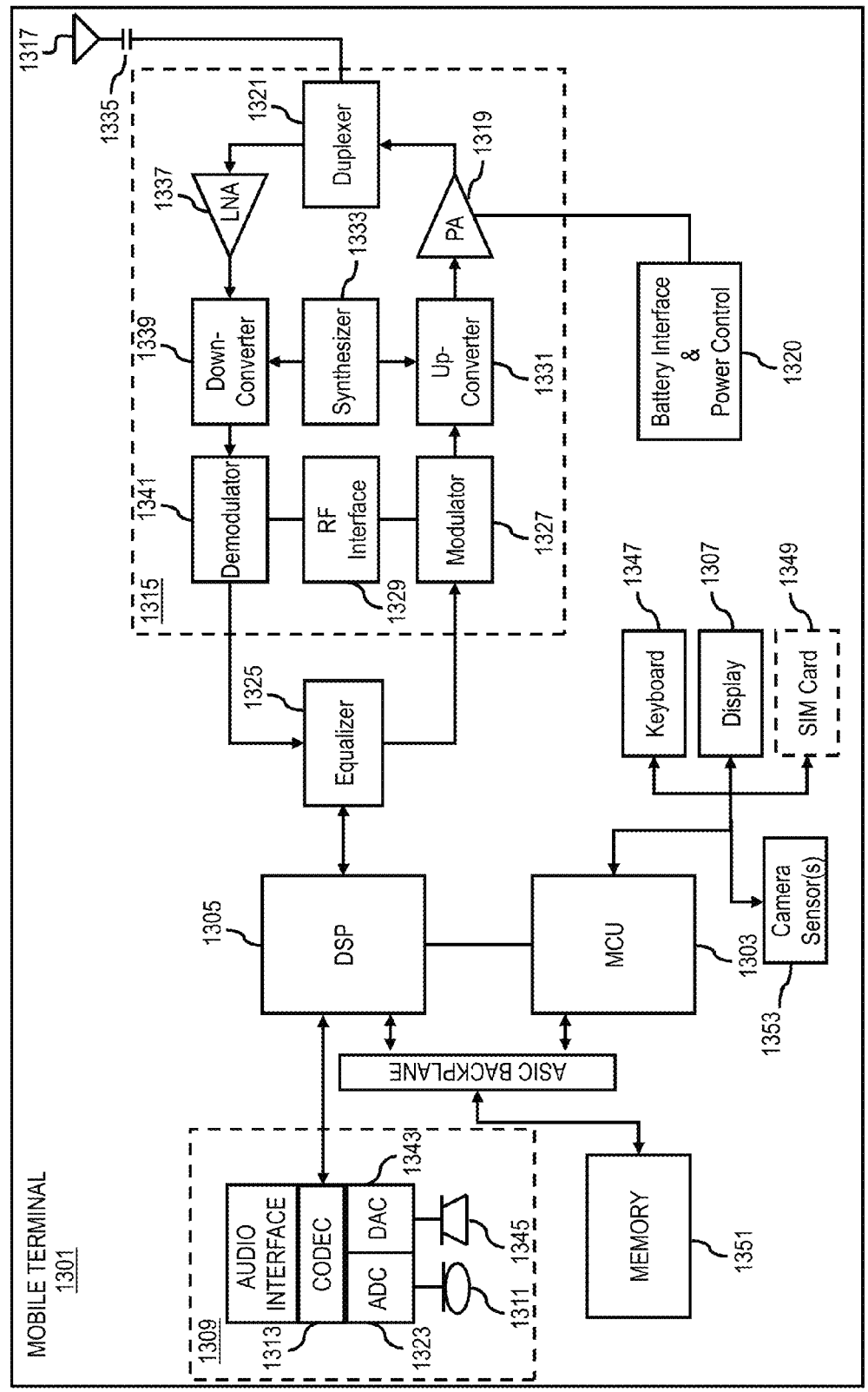
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of presenting comprehensible representation of traffic flow information for various travel segments based on class levels. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of presenting comprehensible representation of traffic flow information for various travel segments based on class levels. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to present comprehensible representation of traffic flow information for various travel segments based on class levels. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   causing, at least in part, a classification of one or more travel segments into one or more class levels;
   causing, at least in part, a designation of one or more representations of traffic flow information for the one or more travel segments based, at least in part, on the one or more class levels, wherein the one or more representations include, at least in part, a link-based traffic flow representation, a heat-map representation, or a combination thereof;
   causing, at least in part, a presentation in a display unit of at least one user interface depicting the one or more representations of the traffic flow information for the one or more travel segments based, at least in part, on the designation;
   determining a classification threshold value;
   causing, at least in part, a designation of the link-based traffic flow representation for the one or more travel segments classified with the one or more class levels that are above the classification threshold; and
   causing, at least in part, a designation of the heat-map representation for the one or more travel segments classified with the one or more class levels that are below the classification threshold.

2. A method of claim 1, wherein the one or more class levels include, at least in part, a high function class level and a low function class level, the method further comprising:
   causing, at least in part, a designation of the link-based traffic flow representation for the one or more travel segments classified in the high function class level; and
   causing, at least in part, a designation of the heat-map representation for the one or more travel segments classified in the low function class level.

3. A method of claim 1, further comprising:
   determining proximity information for at least one user, at least one device associated with the at least one user, or a combination thereof with respect to the one or more travel segments;
   processing the proximity information to determine one or more proximate travel segments that are within at least one threshold boundary from the at least one user, the at least one device associated with the at least one user, or a combination thereof; and
   causing, at least in part, a designation of the link-based traffic flow representation for the one or more proximate travel segments regardless of the one or more class levels classified for the one or more proximate travel segments.

4. A method of claim 1, further comprising:
   determining contextual information associated with the one or more travel segments, at least one user, or a combination thereof, wherein the designation of the one or more representations is further based, at least in part, on the contextual information.

5. A method of claim 4, wherein the contextual information includes, at least in part, temporal information, routing information, speed information, preference information, point-of-interest information, or a combination thereof.

6. A method of claim 1, further comprising:
determining the classification of the one or more travel segments based, at least in part, on one or more characteristics of the one or more travel segments.

7. A method of claim 6, wherein the one or more characteristics include, at least in part, travel segment dimension information, travel segment type information, congestion information, or a combination thereof.

8. A method of claim 1, further comprising:
determining the designation of the one or more representations for the one or more travel segments based, at least in part, on data density information, network resources information, or a combination thereof.

9. A method comprising:
causing, at least in part, a classification of one or more travel segments into one or more class levels;
causing, at least in part, a designation of one or more representations of traffic flow information for the one or more travel segments based, at least in part, on the one or more class levels, wherein the one or more representations include, at least in part, a link-based traffic flow representation, a heat-map representation, or a combination thereof;
causing, at least in part, a presentation in a display unit of at least one user interface depicting the one or more representations of the traffic flow information for the one or more travel segments based, at least in part, on the designation;
processing the traffic flow information to determine one or more recommended travel segments from among the one or more travel segments; and
causing, at least in part, a designation of the link-based traffic flow representation for the one or more recommended segments regardless of the one or more class levels classified for the one or more recommended travel segments.

10. An apparatus comprising:
at least one processor; and
at least one memory including computer program code for one or more programs,
the at least one memory and the computer program code configured to, with the at least one processor, cause the apparatus to perform at least the following,
cause, at least in part, a classification of one or more travel segments into one or more class levels;
cause, at least in part, a designation of one or more representations of traffic flow information for the one or more travel segments based, at least in part, on the one or more class levels, wherein the one or more representations include, at least in part, a link-based traffic flow representation, a heat-map representation, or a combination thereof;
cause, at least in part, a presentation in a display unit of at least one user interface depicting the one or more representations of the traffic flow information for the one or more travel segments based, at least in part, on the designation;
determine a classification threshold value;
cause, at least in part, a designation of the link-based traffic flow representation for the one or more travel segments classified with the one or more class levels that are above the classification threshold; and
cause, at least in part, a designation of the heat-map representation for the one or more travel segments classified with the one or more class levels that are below the classification threshold.

11. An apparatus of claim 10, wherein the one or more class levels include, at least in part, a high function class level and a low function class level, wherein the apparatus is further caused to:
cause, at least in part, a designation of the link-based traffic flow representation for the one or more travel segments classified in the high function class level; and
cause, at least in part, a designation of the heat-map representation for the one or more travel segments classified in the low function class level.

12. An apparatus of claim 10, wherein the apparatus is further caused to:
determine proximity information for at least one user, at least one device associated with the at least one user, or a combination thereof with respect to the one or more travel segments;
process the proximity information to determine one or more proximate travel segments that are within at least one threshold boundary from the at least one user, the at least one device associated with the at least one user, or a combination thereof; and
cause, at least in part, a designation of the link-based traffic flow representation for the one or more proximate travel segments regardless of the one or more class levels classified for the one or more proximate travel segments.

13. An apparatus of claim 10, wherein the apparatus is further caused to:
determine contextual information associated with the one or more travel segments, at least one user, or a combination thereof,
wherein the designation of the one or more representations is further based, at least in part, on the contextual information.

14. An apparatus of claim 13, wherein the contextual information includes, at least in part, temporal information, routing information, speed information, preference information, point-of-interest information, or a combination thereof.

15. An apparatus of claim 10, wherein the apparatus is further caused to:
determine the classification of the one or more travel segments based, at least in part, on one or more characteristics of the one or more travel segments.

16. An apparatus of claim 15, wherein the one or more characteristics include, at least in part, travel segment dimension information, travel segment type information, congestion information, or a combination thereof.

17. A non-transitory computer-readable storage medium carrying one or more sequences of one or more instructions which, when executed by one or more processors, cause an apparatus to at least perform the following steps:
cause, at least in part, a classification of one or more travel segments into one or more class levels;
cause, at least in part, a designation of one or more representations of traffic flow information for the one or more travel segments based, at least in part, on the one or more class levels, wherein the one or more representations include, at least in part, a link-based traffic flow representation, a heat-map representation, or a combination thereof;
cause, at least in part, a presentation in a display unit of at least one user interface depicting the one or more representations of the traffic flow information for the one or more travel segments based, at least in part, on the designation;

determine a classification threshold value;

cause, at least in part, a designation of the link-based traffic flow representation for the one or more travel segments classified with the one or more class levels that are above the classification threshold; and cause, at least in part, a designation of the heat-map representation for the one or more travel segments classified with the one or more class levels that are below the classification threshold.

18. A non-transitory computer-readable storage medium of claim 17, wherein the one or more class levels include, at least in part, a high function class level and a low function class level, wherein the apparatus is further caused to:

cause, at least in part, a designation of the link-based traffic flow representation for the one or more travel segments classified in the high function class level; and cause, at least in part, a designation of the heat-map representation for the one or more travel segments classified in the low function class level.

19. A non-transitory computer-readable storage medium of claim 17, wherein the apparatus is further caused to:

determine proximity information for at least one user, at least one device associated with the at least one user, or a combination thereof with respect to the one or more travel segments;

process the proximity information to determine one or more proximate travel segments that are within at least one threshold boundary from the at least one user, the at least one device associated with the at least one user, or a combination thereof; and cause, at least in part, a designation of the link-based traffic flow representation for the one or more proximate travel segments regardless of the one or more class levels classified for the one or more proximate travel segments.

* * * * *